United States Patent
Yu et al.

(10) Patent No.: US 11,551,333 B2
(45) Date of Patent: Jan. 10, 2023

(54) IMAGE RECONSTRUCTION METHOD AND DEVICE

(71) Applicant: HUAWEI TECHNOLOGIES CO., LTD., Shenzhen (CN)

(72) Inventors: Bing Yu, Hangzhou (CN); Chuanxia Zheng, Shenzhen (CN); Bailan Feng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 18 days.

(21) Appl. No.: 16/903,667

(22) Filed: Jun. 17, 2020

(65) Prior Publication Data

US 2020/0311871 A1 Oct. 1, 2020

Related U.S. Application Data

(63) Continuation of application No. PCT/CN2018/120447, filed on Dec. 12, 2018.

(30) Foreign Application Priority Data

Dec. 20, 2017 (CN) .......................... 201711387428.6

(51) Int. Cl.
*G06T 3/40* (2006.01)
*G06T 5/00* (2006.01)
*G06T 5/50* (2006.01)

(52) U.S. Cl.
CPC .......... *G06T 3/4053* (2013.01); *G06T 3/4046* (2013.01); *G06T 5/003* (2013.01);
(Continued)

(58) Field of Classification Search
None
See application file for complete search history.

(56) References Cited

U.S. PATENT DOCUMENTS

2017/0024852 A1   1/2017 Ztireli et al.

FOREIGN PATENT DOCUMENTS

CN    106096547 A    11/2016
CN    106204447 A    12/2016
(Continued)

OTHER PUBLICATIONS

Kim Jiwon et al: "Deeply-Recursive Convolutional Network for Image Super-Resolution", Conference on Computer Vision and Pattern Recognition, IEEE, Jun. 27, 2016, pp. 1637-1645. XP033021341.
(Continued)

*Primary Examiner* — Jiangeng Sun
(74) *Attorney, Agent, or Firm* — Rimon PC

(57) ABSTRACT

Embodiments of this application provide an image reconstruction method and device. The method includes: inputting a first image into a newly constructed super-resolution model to obtain a reconstructed second image, where a resolution of the second image is higher than that of the first image. The newly constructed super-resolution model is obtained by training an initial super-resolution model by using an error loss. The error loss includes a pixel mean square error and an image feature mean square error. The image feature in the image feature mean square error includes at least one of a texture feature, a shape feature, a spatial relationship feature, and an image high-level semantic feature. According to the embodiments of this application, the quality of a reconstructed image can be improved.

17 Claims, 5 Drawing Sheets

(52) U.S. Cl.
CPC ...... *G06T 5/50* (2013.01); *G06T 2207/20081* (2013.01); *G06T 2207/20084* (2013.01)

(56) References Cited

FOREIGN PATENT DOCUMENTS

| CN | 106600538 A | | 4/2017 | |
|---|---|---|---|---|
| CN | 106683067 A | | 5/2017 | |
| CN | 106991646 A | * | 7/2017 | ........... G06T 3/4053 |
| CN | 107330381 A | * | 11/2017 | ......... G06K 9/00288 |
| CN | 107369189 A | * | 11/2017 | ........... G06T 11/008 |
| CN | 107392316 A | | 11/2017 | |
| CN | 107451619 A | | 12/2017 | |
| CN | 107464217 A | | 12/2017 | |
| CN | 107480772 A | * | 12/2017 | ........... G06K 9/2072 |

OTHER PUBLICATIONS

Tai Ying et al: "Image Super-Resolution via Deep Recursive Residual Network". Conference on Computer Vision and Pattern Recognition, IEEE, Jul. 21, 2017, pp. 2790-2798, XP033249624.

Wu Liu et al: "Beyond Human-level License Plate Super-resolution with Progressive Vehicle Search and Domain Priori GAN", Proceedings of The 2017 ACM on Multimedia Conference, Oct. 23, 2017, pp. 1618-1626, XP55759291 10 pages.

Justin Johnson et al: "Perceptual Losses for Real-Time Style Transfer and Super-Resolution", arxiv.org, Cornell University Library, 201 Oline Library Cornell University Ithaca, NY 14853, Mar. 27, 2016, pp. 1-18, XP080692177.

Guan-Hao Chen et al: "Edge-Based Structural Similarity for Image Quality Assessment", Acoustics, Speech and Signal Processing, Proceedings. IEEE International Conference on, Toulouse, France May 14-19, 2006, IEEE, Piscataway, NJ, USA, vol. 2, May 14, 2006, pp. 933-936, XP010930923.

D. Dai et al: "Jointly Optimized Regressors for Image Super-resolution", Computer Graphics Forum: Journal of The European Association for Computer Graphics, vol. 34, No. 2, May 1, 2015, pp. 95-104, XP055555777.

Sajjadi Mehdi S M et al: "EnhanceNet: Single Image Super-Resolution Through Automated Texture Synthesis", IEEE International Conference on Computer Vision, IEEE, Oct. 22, 2017, pp. 4501-4510, XP033283324.

Junyu Wu et al. "Deep Joint Face Hallucination and Recognition," arXiv:1611 08091v1 [cs.CV] Nov. 24, 2016, total 10 pages.

Justin Johnson et al., "Perceptual Losses for Real-Time Style Transfer and Super-Resolution", Mar. 27, 2016; 18 total pages.

* cited by examiner

IMAGE RECONSTRUCTION METHOD AND DEVICE

CROSS-REFERENCE TO RELATED APPLICATIONS

This application is a continuation of International Application No. PCT/CN2018/120447, filed on Dec. 12, 2018, which claims priority to Chinese Patent Application No. 201711387428.6, filed on Dec. 20, 2017. The disclosures of the aforementioned applications are hereby incorporated by reference in their entireties.

TECHNICAL FIELD

Embodiments of the present invention relate to the field of communications technologies, and in particular, to an image reconstruction method and device.

BACKGROUND

Image super-resolution reconstruction refers to a technology that reconstructs a high-resolution image from a low-resolution image by using an image processing method, can effectively improve an image definition, and has great significance in fields such as video surveillance, camera photographing, high-definition televisions, and medical images. In image super-resolution reconstruction, face image super-resolution reconstruction is widely applied, and the face image super-resolution reconstruction is also referred to as face hallucination.

Currently, a face image super-resolution reconstruction method includes a signal reconstruction-based method and a machine learning-based method. The signal reconstruction-based method is mainly implemented by using a signal reconstruction theory in the signal processing field, for example, Fourier transform and polynomial interpolation. The signal reconstruction-based method is usually easy to implement, but a reconstructed image loses much detail information, and has blurred edges and obvious jagged edges.

The machine learning-based method is to input a low-resolution image, and then reconstruct the low-resolution image by using a super-resolution model, to obtain a reconstructed image obtained through maximum a posteriori probability estimation. The super-resolution model used in the machine learning-based method is obtained by training an initial super-resolution model. A training process of the super-resolution model is a process of adjusting a parameter in the super-resolution model based on a pixel mean square error between a high-resolution image and an image obtained by reconstructing the low-resolution image. However, when image reconstruction is performed by using the super-resolution model that is obtained through training based on only the pixel mean square error, a generated image is evidently smoothed and loses much high-frequency information.

SUMMARY

Embodiments of this application disclose an image reconstruction method and device, to improve image reconstruction quality.

According to a first aspect, an embodiment of this application provides an image reconstruction method. The method includes: inputting a first image into a newly constructed super-resolution model to obtain a reconstructed second image, where a resolution of the second image is higher than that of the first image; the newly constructed super-resolution model is obtained by training an initial super-resolution model by using an error loss; the error loss includes a pixel mean square error and an image feature mean square error; and an image feature includes at least one of a texture feature, a shape feature, a spatial relationship feature, and an image high-level semantic feature. In a training phase of the super-resolution model, the error loss includes the pixel mean square error, and the error loss also includes the image feature mean square error. The error loss used to train the initial super-resolution model includes more comprehensive error loss information. Therefore, the newly constructed super-resolution model that is obtained through training and that is used for image reconstruction is more accurate, so that a loss of high-frequency information of a reconstructed image can be reduced, and reconstruction quality of the reconstructed image can be improved.

In an embodiment, the error loss is an error loss between a third image and a fourth image, and the third image is obtained through reconstruction after inputting a fifth image into the initial super-resolution model; the fourth image is a high-resolution image, and the fifth image is a low-resolution image obtained by performing blurring processing on the fourth image; and the initial super-resolution model is used to reconstruct an image input into the initial super-resolution model, to improve a resolution.

In an embodiment, there are M third images, M fourth images, and M fifth images, there are M error losses, and the M third images are obtained through reconstruction after inputting the M fifth images into the initial super-resolution model; the M error losses are determined based on the M third images and the M fourth images; and any one of the M error losses is an error loss between an $i^{th}$ third image in the M third images and a $j^{th}$ fourth image in the M fourth images, an image obtained after a fifth image obtained by performing blurring processing on the $j^{th}$ fourth image is input into the initial super-resolution model is the $i^{th}$ third image, M is a positive integer greater than 1, and i and j each are a positive integer less than or equal to M. When M is a positive integer greater than 2, the initial super-resolution model is adjusted by using a plurality of error losses obtained by using a plurality of groups of training samples, so that more sample information is provided for adjusting the initial super-resolution model, and the newly constructed super-resolution model obtained through adjustment has higher precision. In addition, if there are a plurality of pairs of training samples, and each time an error loss is obtained, the initial super-resolution model is adjusted based on the error loss, an excessive quantity of adjustment times causes wastes of processing resources and storage resources. However, adjusting the initial super-resolution model by using the plurality of error losses obtained by using the plurality of groups of training samples can reduce a quantity of times of adjusting a parameter in the super-resolution model. Therefore, processing resources and storage resources can be saved.

In an embodiment, the newly constructed super-resolution model is obtained by adjusting a parameter in the initial super-resolution model based on the M error losses; or the initial super-resolution model is the first super-resolution model, a parameter in the first super-resolution model is adjusted based on the first error loss in the M error losses to obtain the second super-resolution model, a parameter in an $r^{th}$ super-resolution model is adjusted based on an $r^{th}$ error loss to obtain an $(r+1)^{th}$ super-resolution model, and the newly constructed super-resolution model is obtained by adjusting a parameter in an $M^{th}$ super-resolution model by using an $M^{th}$ error loss, where r is a positive integer greater than or equal to 1 and less than or equal to M.

In an embodiment, the initial super-resolution model includes n super-resolution submodels, and n is a positive integer greater than or equal to 2; the super-resolution submodel is used to reconstruct image information input into the super-resolution submodel, to improve a resolution; the image information includes pixel value information and image feature information; in the n super-resolution submodels, an input of the first super-resolution submodel is the first image, an output of the first super-resolution submodel is used as an input of the second super-resolution submodel, an output of a $(t-1)^{th}$ super-resolution submodel is used as an input of a $t^{th}$ super-resolution submodel, and an output of the $t^{th}$ super-resolution submodel is used as an input of a $(t+1)^{th}$ super-resolution submodel; t is a positive integer satisfying $2 \leq t \leq n-1$; and the output of the $t^{th}$ super-resolution submodel is used as an input of an output synthesis module, an output of the output synthesis module is used as an input of an $n^{th}$ super-resolution submodel, an output of the $n^{th}$ super-resolution submodel is the second image, and the output synthesis module is configured to determine the input of the $n^{th}$ super-resolution submodel based on reconstructed image information output by the first n−1 super-resolution submodels and a weight of each piece of the output reconstructed image information. When n is a positive integer greater than 1, a plurality of super-resolution submodels are cascaded to reconstruct a low-resolution image. A pixel value of a reconstructed image obtained through reconstruction is higher, so that image quality of the reconstructed image can be improved. In addition, reconstructed images output by the first n−1 super-resolution submodels are all used as image information input into the last super-resolution submodel, and include more image information, so that image information loss is reduced. This can improve image reconstruction quality by improving precision of the newly constructed super-resolution model.

In an embodiment, the reconstructed image information output by the output synthesis module $$O_S = \sum_{k=1}^{n-1}(w_k O_k),$$

and k is a positive integer satisfying $1 \leq k \leq n-1$; and $w_k$ is a weight of a $k^{th}$ super-resolution submodel.

In an embodiment, $w_k$ is the parameter in the initial super-resolution model. In a training process of the initial super-resolution model, a weight $w_k$ of the initial super-resolution model may be optimized based on the error loss.

In an embodiment, the super-resolution submodel is a three-layer fully convolutional deep neural network. In the foregoing three-layer fully convolutional deep neural network, the first convolution layer and the second convolution layer are used to extract image information from a low-resolution image, that is, obtain information that can be used for super-resolution reconstruction. The third convolution layer reconstructs a high-resolution image by using the image information extracted and transformed by the first two layers. The two additional convolution layers in the three-layer fully convolutional deep neural network can help extract more precise image information than extracting the image information by using only one convolution layer. In addition, the super-resolution submodels constituted by three-layer fully convolutional deep neural networks need to be cascaded to constitute the super-resolution model, and cascading a plurality of super-resolution submodels requires more calculation resources, but a relatively small quantity of convolution layers indicates a relatively low calculation amount. Therefore, a tradeoff between calculation resources and precision needs to be considered for a quantity of convolution layers in the super-resolution submodels. When the super-resolution submodel uses the three-layer fully convolutional deep neural network, more precise image information can be extracted by using fewer calculation resources. The more precise image information helps reconstruct a higher-quality reconstructed image and save calculation resources.

In an embodiment, the error loss $L=\lambda_1 L1+\lambda_2 L2+\lambda_3 L3$, where L1 is the pixel mean square error, $\lambda_1$ is a weight of the pixel mean square error, L2 is the image feature mean square error, $\lambda_2$ is a weight of the image feature mean square error, L3 is a regularization term of $w_k$, and $\lambda_3$ is a weight of the regularization term. The added regularization term L3 is used to reduce overfitting, improve precision of the newly constructed super-resolution model, and improve quality of the reconstructed image.

In an embodiment, each convolution layer in the three-layer fully convolutional deep neural network includes at least one convolution kernel, and a weight matrix W of the convolution kernel is a parameter in the initial super-resolution model.

According to a second aspect, an embodiment of this application provides an image reconstruction device, including a processor and a memory. The memory is configured to store a program instruction, and the processor is configured to invoke the program instruction to perform the following operations: inputting a first image into a newly constructed super-resolution model to obtain a reconstructed second image, where a resolution of the second image is higher than that of the first image; the newly constructed super-resolution model is obtained by training an initial super-resolution model by using an error loss; the error loss includes a pixel mean square error and an image feature mean square error; and an image feature includes at least one of a texture feature, a shape feature, a spatial relationship feature, and an image high-level semantic feature. In a training phase of the super-resolution model, the error loss includes the pixel mean square error, and the error loss also includes the image feature mean square error. The error loss used to train the initial super-resolution model includes more comprehensive error loss information, so that a loss of high-frequency information of a reconstructed image can be reduced, and reconstruction quality of the reconstructed image can be improved.

In an embodiment, the error loss is an error loss between a third image and a fourth image, and the third image is obtained through reconstruction after inputting a fifth image into the initial super-resolution model; the fourth image is a high-resolution image, and the fifth image is a low-resolution image obtained by performing blurring processing on the fourth image; and the initial super-resolution model is used to reconstruct an image input into the initial super-resolution model, to improve a resolution.

In an embodiment, there are M third images, M fourth images, and M fifth images, there are M error losses, and the M third images are obtained through reconstruction after inputting the M fifth images into the initial super-resolution model; the M error losses are determined based on the M third images and the M fourth images; and any one of the M error losses is an error loss between an $i^{th}$ third image in the M third images and a $j^{th}$ fourth image in the M fourth images, an image obtained after a fifth image obtained by performing blurring processing on the $j^{th}$ fourth image is input into the initial super-resolution model is the $i^{th}$ third image, M is a positive integer greater than 1, and i and j each are a positive integer less than or equal to M. When M is a positive integer greater than 2, the initial super-resolution model is adjusted by using a plurality of error losses obtained by using a plurality of groups of training samples, so that more sample information is provided for adjusting the initial super-resolution model, and the newly constructed super-resolution model obtained through adjustment has higher precision.

In an embodiment, the newly constructed super-resolution model is obtained by adjusting a parameter in the initial super-resolution model based on the M error losses; or the initial super-resolution model is the first super-resolution model, a parameter in the first super-resolution model is adjusted based on the first error loss in the M error losses to obtain the second super-resolution model, a parameter in an $r^{th}$ super-resolution model is adjusted based on an $r^{th}$ error loss to obtain an $(r+1)^{th}$ super-resolution model, and the newly constructed super-resolution model is obtained by adjusting a parameter in an $M^{th}$ super-resolution model by using an $M^{th}$ error loss, where r is a positive integer greater than or equal to 1 and less than or equal to M.

In an embodiment, the initial super-resolution model includes n super-resolution submodels, and n is a positive integer greater than or equal to 2; the super-resolution submodel is used to reconstruct image information input into the super-resolution submodel, to improve a resolution; the image information includes pixel value information and image feature information; in the n super-resolution submodels, an input of the first super-resolution submodel is the first image, an output of the first super-resolution submodel is used as an input of the second super-resolution submodel, an output of a $(t-1)^{th}$ super-resolution submodel is used as an input of a $t^{th}$ super-resolution submodel, and an output of the $t^{th}$ super-resolution submodel is used as an input of a $(t+1)^{th}$ super-resolution submodel; t is a positive integer satisfying $2 \leq t \leq n-1$; and the output of the $t^{th}$ super-resolution submodel is used as an input of an output synthesis module, an output of the output synthesis module is used as an input of an $n^{th}$ super-resolution submodel, an output of the $n^{th}$ super-resolution submodel is the second image, and the output synthesis module is configured to determine the input of the $n^{th}$ super-resolution submodel based on reconstructed image information output by the first n−1 super-resolution submodels and a weight of each piece of the output reconstructed image information. When n is a positive integer greater than 1, a plurality of super-resolution submodels are cascaded to reconstruct a low-resolution image. A pixel value of a reconstructed image obtained through reconstruction is higher, so that image quality of the reconstructed image can be improved. In addition, reconstructed images output by the first n−1 super-resolution submodels are all used as image information input into the last super-resolution submodel, and include more image information, so that image information loss is reduced. This can improve precision of the newly constructed super-resolution model, and improve image reconstruction quality.

In an embodiment, the reconstructed image information output by the output synthesis module $$O_S = \sum_{k=1}^{n-1}(w_k O_k),$$

and k is a positive integer satisfying $1 \leq k \leq n-1$; and $w_k$ is a weight of a $k^{th}$ super-resolution submodel.

In an embodiment, $w_k$ is the parameter in the initial super-resolution model. In a training process of the initial super-resolution model, a weight $w_k$ of the initial super-resolution model may be optimized based on the error loss.

In an embodiment, the super-resolution submodel is a three-layer fully convolutional deep neural network. In the foregoing three-layer fully convolutional deep neural network, the first layer and the second layer are used to extract image information from a low-resolution image, that is, obtain information that can be used for super-resolution reconstruction. The third layer reconstructs a high-resolution image by using the image information extracted and transformed by the first two layers. The two additional convolution layers in the three-layer fully convolutional deep neural network can help extract more precise image information than extracting the image information by using only one convolution layer. In addition, the super-resolution submodels constituted by three-layer fully convolutional deep neural networks need to be cascaded to constitute the super-resolution model, and cascading a plurality of super-resolution submodels requires more calculation resources, but a relatively small quantity of convolution layers indicates a relatively low calculation amount. Therefore, a tradeoff between calculation resources and precision needs to be considered for a quantity of convolution layers in the super-resolution submodels. When the super-resolution submodel uses the three-layer fully convolutional deep neural network, more precise image information can be extracted by using fewer calculation resources. The more precise image information helps reconstruct a higher-quality reconstructed image and save calculation resources.

In an embodiment, the error loss $L = \lambda_1 L1 + \lambda_2 L2 + \lambda_3 L3$, where L 1 is the pixel mean square error, $\lambda_1$ is a weight of the pixel mean square error, L2 is the image feature mean square error, $\lambda_2$ is a weight of the image feature mean square error, L3 is a regularization term of $w_k$, and $\lambda_3$ is a weight of the regularization term. The added regularization term L3 is used to reduce overfitting, improve precision of the newly constructed super-resolution model, and improve quality of the reconstructed image.

In an embodiment, each convolution layer in the three-layer fully convolutional deep neural network includes at least one convolution kernel, and a weight matrix W of the convolution kernel is a parameter in the initial super-resolution model.

According to a third aspect, an embodiment of this application provides an image reconstruction device. The device includes a module or a unit configured to perform the image reconstruction method provided in any one of the first aspect or the possible implementations of the first aspect.

According to a fourth aspect, an embodiment of the present invention provides a chip system. The chip system includes at least one processor, a memory, and an interface circuit. The memory, the interface circuit, and the at least one processor are interconnected by using a line, and the at least one memory stores a program instruction. When the program instruction is executed by the processor, the method described in any one of the first aspect or the possible implementations of the first aspect is implemented.

According to a fifth aspect, an embodiment of the present invention provides a computer-readable storage medium. The computer-readable storage medium stores a program instruction, and when the program instruction is run by a processor, the method described in any one of the first aspect or the possible implementations of the first aspect is implemented.

According to a sixth aspect, an embodiment of the present invention provides a computer program product. When the computer program product is run by a processor, the method described in any one of the first aspect or the possible implementations of the first aspect is implemented.

In the training phase of the super-resolution model, the error loss includes the pixel mean square error, and the error loss also includes the image feature mean square error. The error loss used to train the initial super-resolution model includes more comprehensive error loss information, so that a loss of high-frequency information of the reconstructed image can be reduced, and reconstruction quality of the reconstructed image can be improved. n super-resolution submodels are used. When n is a positive integer greater than 1, a plurality of super-resolution submodels are cascaded to reconstruct the low-resolution image. The pixel value of the reconstructed image obtained through reconstruction is higher, so that the image quality of the reconstructed image can be improved. In addition, the reconstructed images output by the first n−1 super-resolution submodels are all used as the image information input into the last super-resolution submodel, and include more image information, so that image information loss is reduced. This can improve the image reconstruction quality by improving the precision of the newly constructed super-resolution model.

BRIEF DESCRIPTION OF DRAWINGS

The following describes the accompanying drawings used in the embodiments of this application.

DESCRIPTION OF EMBODIMENTS

Figure 1:
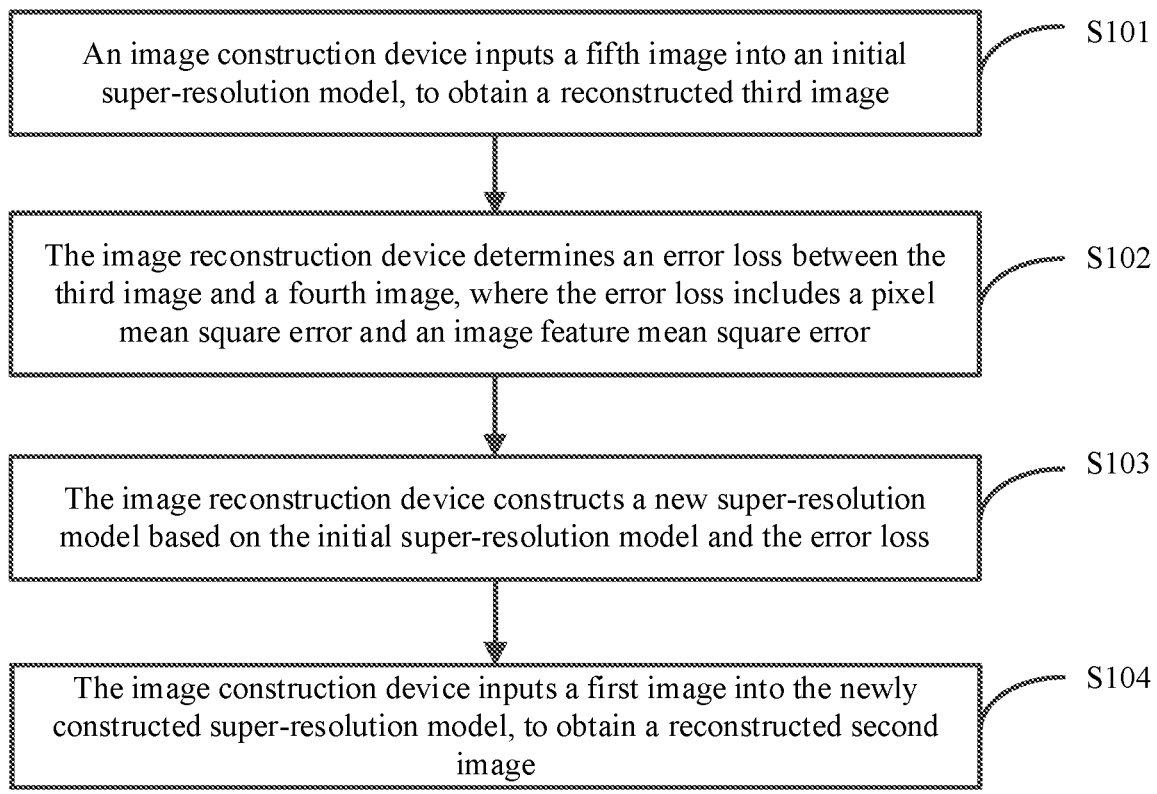
FIG. 1 is a schematic flowchart of an image reconstruction method according to an embodiment of this application.

First, to facilitate understanding of the embodiments of this application, some concepts or terms in the embodiments of this application are explained.

(1) Super-Resolution

Super-resolution (SR) refers to a technology that reconstructs a high-resolution (HR) image from a low-resolution (LR) image by using an image processing method and by using a computer. The high-resolution image means that the image has a high pixel density, and can provide more image details. These details usually play a key role during application.

Image super-resolution technologies can be classified into two types: a reconstruction-based image super-resolution method and a learning-based image super-resolution method. In the reconstruction-based image super-resolution method, a high-resolution image with a maximum a posteriori probability may be obtained through statistics collection and estimation by using a frequency domain algorithm or a space domain algorithm. The learning-based image super-resolution method may include two phases: a training phase and a test phase.

In the training phase, an initial super-resolution model and a training set are first established. The training set may include a plurality of low-resolution images and a high-resolution image corresponding to each low-resolution image. The low-resolution images and the corresponding high-resolution images in the training set are used to learn a correspondence between the high-resolution images and the low-resolution images, to correct a value of a parameter in the initial super-resolution model, so as to converge an error between the high-resolution image and a reconstructed image. Finally, a newly constructed super-resolution model obtained after training is determined. In the test phase, super-resolution reconstruction of an image may be guided by using the newly constructed super-resolution model.

A method for obtaining the low-resolution image and the high-resolution image corresponding to the low-resolution image may be: processing the high-resolution image by using a fuzzy function, to obtain the corresponding low-resolution image.

The initial super-resolution model may be a model determined based on an experiment, and may be non-linear. The super-resolution model may be a convolutional neural network.

(2) Convolutional Neural Network

The neural network may include a neural unit. The neural unit may be an operation unit that uses $x_s$ and an intercept 1 as an input, and an output of the operation unit may be as follows:

$$h_{W,b}(x)=f(W^T x)=f(\Sigma_{s=1}^{n} W_s x_s + b) \quad (1\text{-}1)$$

s=1, 2, . . . , or n, n is a natural number greater than 1, Ws is a weight of xs, and b is an offset of the neural unit. f is an activation function of the neural unit, and is used to introduce a non-linear feature to the neural network, to convert an input signal in the neural unit into an output signal. The output signal of the activation function may be used as an input of a next convolutional layer. The activation function may be a sigmoid function. The neural network is a network constituted by joining many single neural units together, to be specific, an output of a neural unit may be an input of another neural unit. An input of each neural unit may be connected to a local receptive field of a previous layer to extract a feature of the local receptive field. The local receptive field may be a region including several neural units.

The convolutional neural network (CNN) is a deep neural network with a convolutional structure. The convolutional neural network includes a feature extractor including a convolutional layer and a sub-sampling layer. The feature extractor may be considered as a filter. A convolution process may be considered as performing convolution on an input image or a convolution feature map by using a trainable filter. The convolutional layer is a neuron layer that is in the convolutional neural network and that performs convolution processing on an input signal. At the convolutional layer in the convolutional neural network, a neuron may be connected only to some adjacent-layer neurons. One convolutional layer usually includes several feature maps, and each feature map may include some neural units arranged in a rectangle shape. The neural units on a same feature map share a weight. The shared weight herein is a convolution kernel. Weight sharing may be understood as that a manner of extracting image information is irrelevant to a location. The principle implied herein is that statistical information of a part of an image is the same as that of another part. To be specific, image information that is learned in a part can also be used in another part. Therefore, image information obtained through same learning can be used for all locations on the image. In a same convolutional layer, a plurality of convolution kernels may be used to extract different image information. Usually, a larger quantity of convolution kernels indicates richer image information reflected by a convolution operation.

A convolution kernel may be initialized in a form of a random-size matrix. A proper weight may be obtained by a convolution kernel through learning in a training process of the convolutional neural network. In addition, a direct benefit brought by weight sharing is to reduce a connection between layers of the convolutional neural network, and further reduce an overfitting risk.

(3) Back Propagation Algorithm

The convolutional neural network may correct the value of the parameter in the initial super-resolution model in the training process by using an error back propagation (BP) algorithm, so that a reconstruction error loss of the super-resolution model becomes small. Specifically, an error loss is caused when a signal is input and output by using forward propagation, and the parameter in the initial super-resolution model is updated by using back propagation error loss information, so that the error loss is converged. The back propagation algorithm is an error-loss-centered back propagation motion intended to obtain a parameter, such as a weight matrix, of an optimal super-resolution model.

(4) Pixel Value and Image Feature

Pixel value information and image feature information of an image may be collectively referred to as image information.

The pixel value may be a red green blue (RGB) color value, and the pixel value may be a long integer indicating a color. For example, the pixel value is 65536*Red+256*Green+Blue, where Blue represents a blue component, Green represents a green component, and Red represents a red component. In the color components, a smaller value indicates lower brightness, and a larger value indicates higher brightness. For a grayscale image, the pixel value may be a grayscale value.

The image feature includes a texture feature, a shape feature, a spatial relationship feature, and an image high-level semantic feature. Details are described as follows:

The texture feature of the image is a global feature of the image, and describes a surface property of a scene corresponding to the image or an image region. The texture feature of the image is not a feature that is based on a single pixel, but is a feature obtained through statistics collection and calculation in a region including a plurality of pixels. As a statistical feature, the texture feature of the image has a strong resistance to noises. However, when a resolution of the image changes, the texture feature of the image may have a relatively large deviation. The texture feature of the image may be described by using the following methods: a. A statistical method is, for example, extracting a texture feature from an autocorrelation function of the image (or a power spectral function of the image), and extracting feature parameters such as a thickness and directivity of a texture by calculating the power spectral function of the image. b. A geometric method is a texture feature analysis method that is based on a theory of a texture primitive (a basic texture element). In this method, a complex texture feature may be constituted by several simple texture primitives that are repeatedly arranged in a regular form. c. A model method is based on an image construction model, and uses a parameter of the model to represent the texture feature.

The shape feature of the image may have two types of representation methods: a contour feature and a region feature. The contour feature of the image is a contour of an outer boundary of an object, and the region feature of the image is an entire shape region occupied by the object. The shape feature of the image may be described by using the following methods: a. A boundary feature method is to obtain a shape parameter of the image by describing a boundary feature. b. The Fourier shape descriptor method is to express the shape feature by using a Fourier transform of the object boundary as a shape description, and using a closure property and periodicity of the region boundary to derive a curvature function, a centroid distance, and a complex coordinate function from boundary points. c. A geometric parameter method is to use a region feature description method for shape expression and matching. For example, a shape parameter matrix, an area, a boundary length, and the like are used to describe the shape feature of the image.

The spatial relationship feature of the image is a mutual spatial location relationship or a relative direction relationship among a plurality of regions obtained by segmenting the image. These relationships may also be classified into a connection relationship, an adjacency relationship, an overlapping relationship, an overlapping relationship, an inclusion relationship, an inclusion relationship, and the like. Usually, spatial locations of an image may be classified into two types: a relative spatial location and an absolute spatial location. The relative spatial location emphasizes a relative location among targets, for example, an up-down and left-right relationship, and the like. The absolute spatial location emphasizes a distance and orientation among the targets. Use of the spatial relationship feature of the image can enhance an ability of describing and distinguishing image content, but the spatial relationship feature is usually sensitive to rotation, inversion and scale change of the image or the object.

Compared with the texture feature, the shape feature, and the spatial relationship feature of the image, the image high-level semantic feature is a higher-level cognitive feature used to describe human understanding of the image. The image high-level semantic feature is to determine, by using the image as an object, a target at a location in the image, a mutual relationship among target scenarios, a scenario of the image, and how to apply the scenario. Extracting the image high-level semantic feature is a process of converting an input image into a text-like language expression that can be intuitively understood. A correspondence between an image and a semantic text needs to be established to obtain the image high-level semantic feature.

Based on an abstraction degree of a combination of semantic elements in the image, image high-level semantic features may be classified into an object semantic feature, a spatial relationship semantic feature, a scenario semantic feature, a behavior semantic feature, an emotion semantic feature, and the like. The object semantic feature may be a feature used to determine a person, an animal, a physical object, and the like. The spatial relationship semantic feature may be, for example, a semantic feature used to determine that "a person is in front of a house" or "a ball is on a grass". The scenario semantic feature may be, for example, a semantic feature used to determine "sea" or "a wilderness". The behavior semantic feature may be, for example, a semantic feature used to determine "a dance performance" or "a sports competition". The emotion semantic feature may be, for example, a semantic feature used to determine "a pleasant image" or "an exciting image". The object semantic feature and the spatial relationship semantic feature need to be logically inferred and a type of the target in the image needs to be identified. The scenario semantic feature, the behavior semantic feature, and the emotion semantic feature relate to an abstract property of the image, and high-level inference needs to be performed on a meaning of the feature of the image.

It may be understood that the foregoing examples of the image high-level semantic feature are merely used to explain the image high-level semantic feature in the embodiments of this application, and should not constitute a limitation.

Based on different sources of the image high-level semantic feature, a method for extracting the image high-level semantic feature may include a processing range-based method, a machine learning-based method, a human-computer interaction-based method, and an external information source-based method. The processing range-based method may be performed on a premise of image segmentation and object identification. Semantics mining is performed by using an object template, a scenario classifier, and the like and by identifying objects and a topology relationship among the objects, to generate corresponding scenario semantic information. The machine learning-based method is to learn a low-level feature of the image, and mine an association between the low-level feature and image semantics, to establish a mapping relationship between the low-level feature and the high-level semantic feature of the image. The machine learning-based method mainly includes two key steps: The first is extraction of the low-level feature, such as a texture and a shape. The second is the application of a mapping algorithm. In the human-computer interaction-based method, a system usually uses the low-level feature, and a user adds high-level knowledge. The extraction method mainly includes two aspects: image preprocessing and feedback learning. An image preprocessing manner may be manually labeling images in an image library, or may be some automatic or semi-automatic image semantic labeling methods. Feedback learning is to add manual intervention to the process of extracting image semantics, extract semantic features of the image through repeated interactions between the user and the system, and establish and correct high-level semantic concepts associated with image content.

(5) Error Loss

An error loss caused when a signal is input and output by using forward propagation may include a pixel mean square error and a feature loss. The feature loss may be an image feature mean square error, and an image feature may include at least one of a texture feature, a shape feature, a spatial relationship feature, and an image high-level semantic feature. The following separately describes the pixel mean square error and the image feature mean square error.

A reconstructed image of an input low-resolution image may be obtained based on an initial model, and a pixel mean square error, namely, a pixel mean square error loss, between the reconstructed image and a high-resolution image corresponding to the input low-resolution image may be calculated:

$$L1 = \frac{1}{FH}\sum_{x=1}^{F}\sum_{y=1}^{H}(I_{1,x,y} - I_{2,x,y})^2 \qquad (1-2)$$

L1 is the pixel mean square error loss, F and H are respectively pixel values of a width and a height of the image, $I_{1, x, y}$ is a pixel value, at a location (x, y), of the high-resolution image corresponding to the input low-resolution image, and $I_{2, x, y}$ is a pixel value, at the location (x, y), of the reconstructed image of the low-resolution image.

The image feature may be a feature extracted by an image feature extraction apparatus from the reconstructed image and the high-resolution image, and the image feature may be an N-dimensional vector $\Theta$. The feature loss may be a feature mean square error between the reconstructed image and the high-resolution image, that is, $$L2 = \frac{1}{N}\sum_{i=1}^{N}(\Theta_{1,i} - \Theta_{2,i})^2 \qquad (1-3)$$

L2 is the feature loss, $\Theta_{1,i}$ is an $i^{th}$-dimensional image feature value of the high-resolution image corresponding to the low-resolution image, $\Theta_{2,i}$ s an $i^{th}$-dimensional image feature value of the reconstructed image of the low-resolution image, and i is a positive integer greater than 1 and less than N.

(6) Regularization

When an initial model is constructed, a complex model is usually used to fit complex data. However, using the complex model may cause a risk of overfitting. Regularization is a common method in mathematical optimization, which can control an amplitude of a to-be-optimized parameter, to avoid overfitting. Overfitting indicates that the model has a small error in a training set but a large error in a test set, that is, has a poor generalization capability. Overfitting is usually caused by noises in data or by using an excessively complex model to fit the data.

In the formula (1-1), an objective is to optimize a least square error (least square error). The least square error is:

$$E = \sum_{i=1}^{N}(y_i - f(x_i))^2 + \lambda W^T W, \text{ or} \qquad (1-4)$$

$$E = \sum_{i=1}^{N}(y_i - f(x_i))^2 + \lambda \sum |W_I| \qquad (1-5)$$

$f(x_i)$ is a value of the constructed model at $x_i$, the constructed initial model may be $f(x_i) = w_0 x_0 + w_1 x_1 + \ldots + w_N x_N$, $y_i$ is a sampling value, and $w^T w$. $w^T w$ and $\Sigma |W_i|$ are regularization items, and their objective is to reduce a risk of overfitting. W may be a weight matrix, and $\lambda$ is a weight of the regularization item.

During image reconstruction, only the pixel mean square error is considered in the training process of the super-resolution model in the prior art. The initial super-resolution model is trained by using the error loss including the pixel mean square error between the super-resolution image reconstructed from the low-resolution image in the training set and the high-resolution image corresponding to the low-resolution image, so that the pixel mean square error converges, to obtain a newly constructed super-resolution model. In other words, the error loss caused by only the pixel mean square error is considered in the newly constructed super-resolution model, and a reconstructed image obtained by using the newly constructed super-resolution model obtained in the foregoing training process loses much high-frequency information. This reduces reconstruction quality of the reconstructed image.

To improve the reconstruction quality of the reconstructed image, an embodiment of this application provides an image reconstruction method. In the training phase of the super-resolution model, the error loss includes the pixel mean square error, and the error loss also includes the image feature mean square error. The error loss used to train the initial super-resolution model includes more comprehensive error loss information, so that a loss of high-frequency information of a reconstructed image can be reduced, and reconstruction quality of the reconstructed image can be improved.

Inventive principles in this application may include: In the training phase of the super-resolution model, the low-resolution image is reconstructed by using the initial super-resolution model, to obtain a reconstructed image, that is, a super-resolution image. An error loss between the super-resolution image and a high-resolution image corresponding to the low-resolution image is determined, and the error loss includes the pixel mean square error and the image feature mean square error. In addition, a newly constructed super-resolution model is determined based on the error loss and the initial super-resolution model. A parameter in the initial super-resolution model is adjusted by using a more comprehensive error loss, so that precision of image reconstruction of the newly constructed super-resolution model can be improved, and reconstruction quality of the reconstructed image is improved.

Based on the foregoing main inventive principles, the following describes an image reconstruction method provided in this application.

Figure 2:
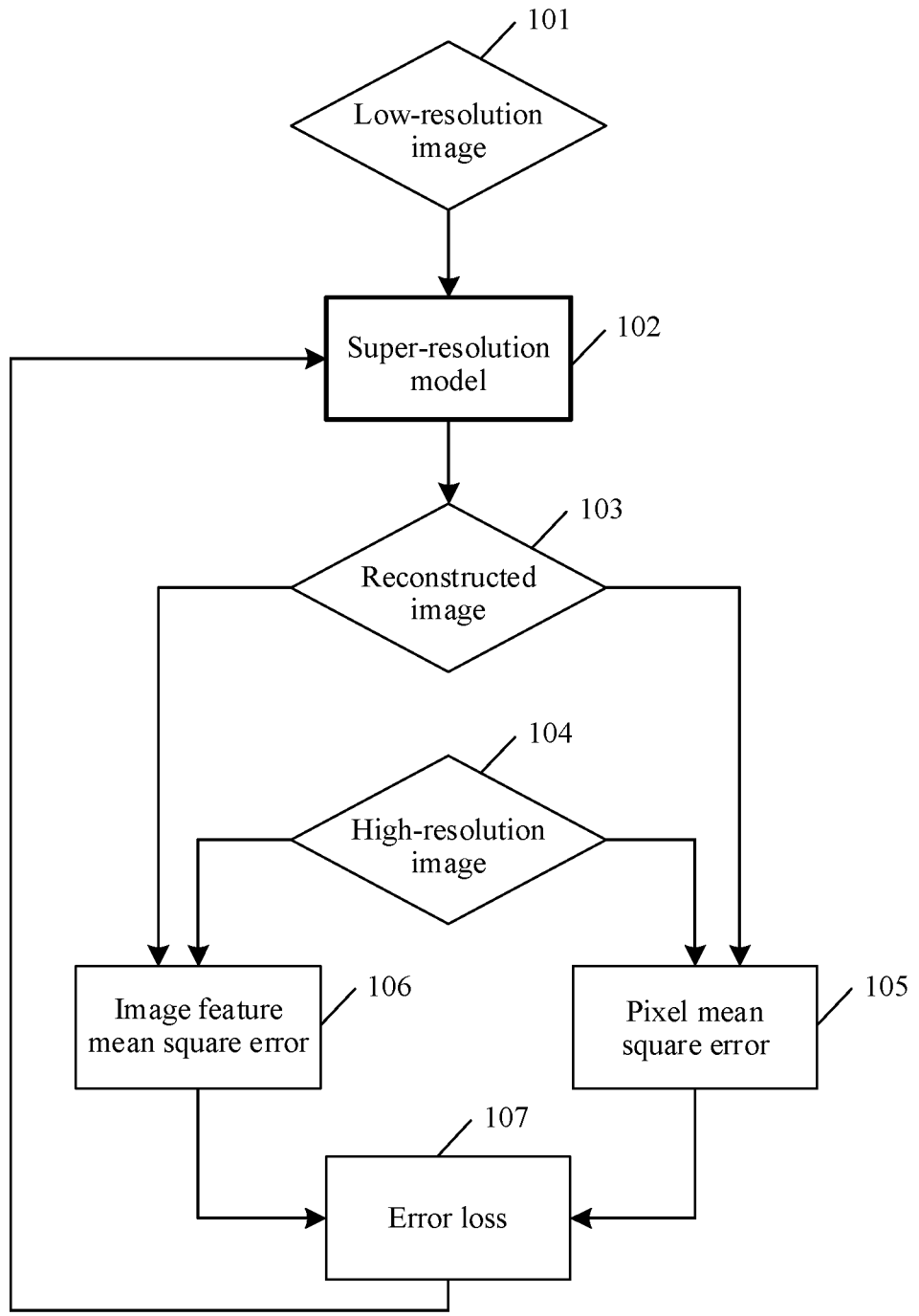
FIG. 2 is a schematic block diagram of a method for constructing an image reconstruction model according to an embodiment of this application.

Referring to FIG. 1 and FIG. 2, FIG. 1 is a schematic flowchart of an image reconstruction method according to an embodiment of this application. As shown in FIG. 1, the image reconstruction method includes but is not limited to the following steps S101 to S104.

S101: An image reconstruction device inputs a fifth image into an initial super-resolution model to obtain a reconstructed third image.

S102: The image reconstruction device determines an error loss between the third image and a fourth image, where the error loss includes a pixel mean square error and an image feature mean square error.

S103: The image reconstruction device constructs a newly constructed super-resolution model based on the initial super-resolution model and the error loss.

S104: The image reconstruction device inputs a first image into the newly constructed super-resolution model to obtain a reconstructed second image.

In this embodiment of this application, an image reconstruction model is the super-resolution model, and is used to reconstruct an image that is input into the super-resolution model, to improve a resolution. A process of establishing the super-resolution model may include a training phase and a test phase. The training phase is a process of training the initial super-resolution model by using a low-resolution image and a high-resolution image corresponding to the low-resolution image, to converge an error loss. In the test phase, a low-resolution test image is input into the newly constructed super-resolution model to obtain a reconstructed image, and the newly constructed super-resolution model may be tested to reconstruct an image, to improve an image resolution. The test phase may also be considered as a process of reconstructing an image by using the newly constructed super-resolution model. Steps S101 to S103 may be considered as a procedure of the training phase of the super-resolution model. The newly constructed super-resolution model is a super-resolution model whose error is converged and that is obtained by training the initial super-resolution model by using the error loss and adjusting a parameter in the initial super-resolution model. The newly constructed super-resolution model may be directly used to reconstruct an image to improve an image resolution. Step S104 may be considered as a process of reconstructing an image by using the newly constructed super-resolution model, to improve the image resolution, that is, a procedure of the test phase of the newly constructed super-resolution model.

Specifically, FIG. 2 is a schematic block diagram of a method for constructing an image reconstruction model according to an embodiment of this application. As shown in FIG. 2, a low-resolution image 101 is input into an initial super-resolution model 102, and the low-resolution image 101 is reconstructed by the initial super-resolution model 102 to obtain a reconstructed image 103. A pixel mean square error 105 between the reconstructed image 103 and a high-resolution image 104 is calculated, and an image feature mean square error 106 between the reconstructed image 103 and the high-resolution image 104 is calculated. Image features may be an image feature of the reconstructed image and an image feature of the high-resolution image that are extracted by an image feature extraction apparatus from the reconstructed image 103 and the high-resolution image 104. An error loss 107 is determined based on the pixel mean square error 105 and the image feature mean square error 106, and a super-resolution model is updated based on the error loss 107 and the initial super-resolution model 102. The low-resolution image is an image whose resolution is relatively low and that is obtained after blurring processing is performed on the high-resolution image.

In a test phase, a first image is a low-resolution image, and a second image is a reconstructed image reconstructed by the reconstructed super-resolution model. In a training phase, a fifth image is a low-resolution image, a third image is a reconstructed image reconstructed by the initial super-resolution model, and a fourth image is a high-resolution image corresponding to the fifth image. The fifth image may be a low-resolution image obtained by performing blurring processing on the fourth image. The fourth image and the fifth image constitute a training set of a high-resolution image and a low-resolution image.

In an embodiment, step S101 may be inputting M fifth images into the initial super-resolution model to obtain M reconstructed third images. Step S102 may be determining M error losses based on the M third images and M fourth images, where any one of the M error losses is an error loss between an $i^{th}$ third image in the M third images and a $j^{th}$ fourth image in the M fourth images, an image obtained after a fifth image obtained by performing blurring processing on the $j^{th}$ fourth image is input into the initial super-resolution model is the $i^{th}$ third image, M is an integer greater than 1, and i and j each are a positive integer less than or equal to M.

In an embodiment, in one case, the newly constructed super-resolution model may be obtained by adjusting a parameter in the initial super-resolution model based on the M error losses.

In another case, the initial super-resolution model is the first super-resolution model, a parameter in the first super-resolution model is adjusted based on the first error loss in the M error losses to obtain the second super-resolution model, a parameter in an $r^{th}$ super-resolution model is adjusted based on an $r^{th}$ error loss to obtain an $(r+1)^{th}$ super-resolution model, and the newly constructed super-resolution model is obtained by adjusting a parameter in an $M^{th}$ super-resolution model by using an $M^{th}$ error loss, where r is a positive integer greater than or equal to 1 and less than or equal to M.

In other words, there may be a plurality of pairs of training samples, and the M error losses may be obtained through calculation by using M pairs of training samples. In the first case, the initial super-resolution model is adjusted once by using the M error losses, to obtain the newly constructed super-resolution model. In the second case, each time an error loss in the M error losses is obtained, the super-resolution model is adjusted by using the error loss, that is, the super-resolution model is adjusted for M times to obtain the newly constructed super-resolution model. When M is a positive integer greater than 2, the initial super-resolution model is adjusted once by using a plurality of error losses obtained by using a plurality of groups of training samples, to obtain the newly constructed super-resolution model, so that more sample information is provided for adjusting the parameter in the initial super-resolution model, and the newly constructed super-resolution model obtained through adjustment has higher precision. In addition, if there are a plurality of pairs of training samples, and each time an error loss is obtained, the initial super-resolution model is adjusted based on the error loss, an excessive quantity of adjustment times causes wastes of processing resources and storage resources. However, if the parameter in the initial super-resolution model is adjusted once by using the plurality of error losses obtained by using the plurality of groups of training samples, to obtain the newly constructed super-resolution model, a quantity of times of adjusting the parameter in the super-resolution model can be reduced. Therefore, processing resources and storage resources can be saved.

It should be noted that a method for training the initial super-resolution model based on the plurality of error losses to obtain the newly constructed super-resolution model is not limited to the foregoing two methods, and another method may be used to train the initial super-resolution model based on the plurality of error losses to obtain the newly constructed super-resolution model. For example, the super-resolution model is trained for N times, and at least one training uses more than one error loss. N may be a positive integer greater than 1 and less than M. The methods provided in the foregoing two cases are merely used to explain this embodiment of this application, and should not constitute a limitation.

Figure 3:
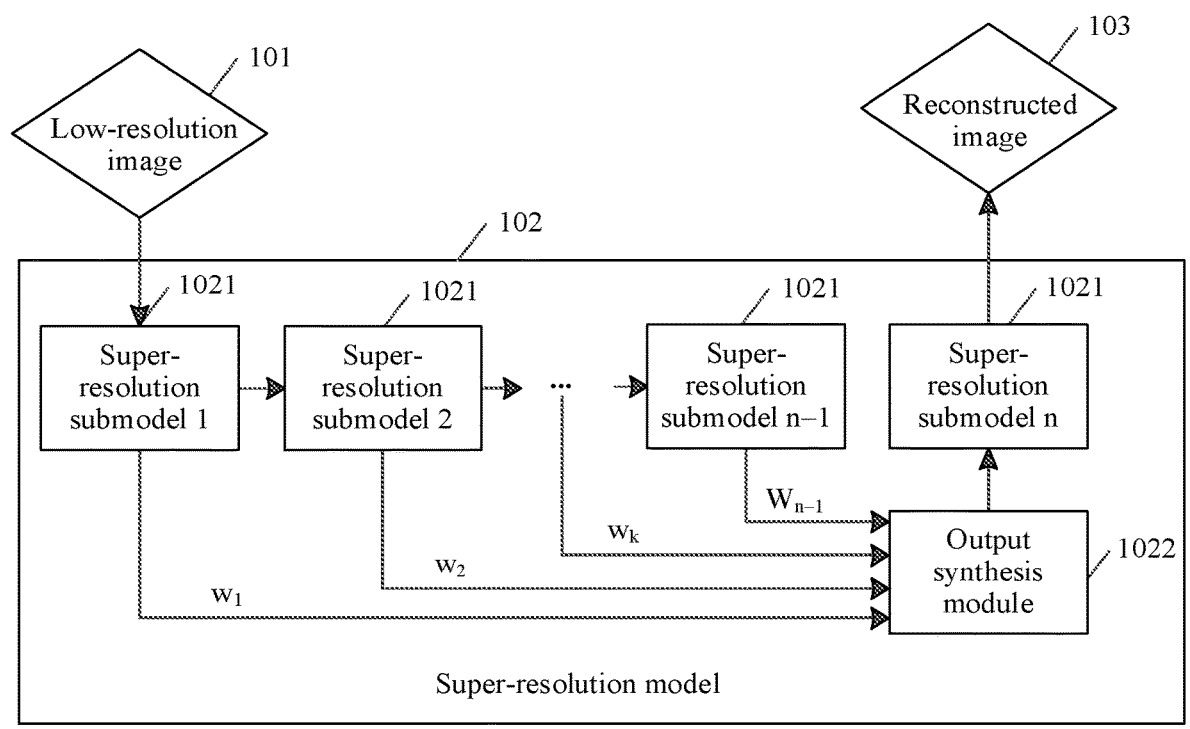
FIG. 3 is a schematic structural diagram of a super-resolution model according to an embodiment of this application.

In an embodiment, the super-resolution model may include a plurality of super-resolution submodels. FIG. 3 is a schematic structural diagram of a super-resolution model according to an embodiment of this application. As shown in FIG. 3, the super-resolution model 102 may include n super-resolution submodels 1021, and n is a positive integer greater than or equal to 2. The super-resolution submodel 1021 is used to reconstruct image information input into the super-resolution submodel 1021, to improve a resolution. The image information includes pixel value information and image feature information.

In the n super-resolution submodels, an input of the first super-resolution submodel 1 is a first image, that is, a low-resolution image 101, an output of the first super-resolution submodel 1 is used as an input of the second super-resolution submodel 2, an output of a $(t-1)^{th}$ super-resolution submodel t-1 is used as an input of a $t^{th}$ super-resolution submodel t, and an output of the $t^{th}$ super-resolution submodel t is used as an input of a $(t+1)^{th}$ super-resolution submodel t+1; t is a positive integer satisfying $2 \leq t \leq n-1$; and the output of the $t^{th}$ super-resolution submodel t is used as an input of an output synthesis module 1022, an output of the output synthesis module 1022 is used as an input of an $n^{th}$ super-resolution submodel n, an output of the $n^{th}$ super-resolution submodel n is a second image, that is, a reconstructed image 103, and the output synthesis module 1022 is configured to determine image information input into the $n^{th}$ super-resolution submodel n based on reconstructed image information output by the first n-1 super-resolution submodels 1021 and a weight of each piece of the output reconstructed image information.

The super-resolution model 102 may be included in an image reconstruction device, so that the image reconstruction device performs the image reconstruction method described in FIG. 1.

When n is a positive integer greater than 1, a plurality of super-resolution submodels are cascaded to reconstruct a low-resolution image. A pixel value of a reconstructed image obtained through reconstruction is higher, so that image quality of the reconstructed image can be improved. In addition, the reconstructed images output by the first n-1 super-resolution submodels are all used as image information input into the last super-resolution submodel, and include more image information, so that image information loss is reduced. This can improve image reconstruction quality by improving precision of the newly constructed super-resolution model.

When the super-resolution model is actually designed, a quality requirement on the reconstructed image and calculation resources need to be considered for a quantity of the super-resolution submodels. A higher quality requirement on the reconstructed image requires a larger quantity of the super-resolution submodels. However, the larger quantity of the super-resolution submodels causes a larger system calculation amount, and consumes more calculation resources. Therefore, the quantity of the super-resolution submodels needs to be selected based on a tradeoff between the quality requirement on the reconstructed image and the calculation resources.

For example, as shown in FIG. 3, it is assumed that image information that can be reconstructed by the first super-resolution submodel is about 90% of image information of the high-resolution image in the training set, the 90% image information is first image information, image information that can be reconstructed by the second super-resolution submodel is about 90% of image information other than the first image information, and so on. In other words, in an image reconstruction process of each super-resolution submodel, 10% image information of remaining image information that is not reconstructed is lost. The remaining image information that is not reconstructed may be understood as image information lost by a previous super-resolution submodel. For the first super-resolution submodel, the remaining image information that is not reconstructed may be understood as all image information of the high-resolution image. If the quality requirement on the reconstructed image is to reconstruct image information with image quality of 99% of the high-resolution image, and the calculation resources can process a maximum of five super-resolution submodels in real time, assuming that the quantity of the super-resolution submodels is and N is a positive integer greater than or equal to 1, N satisfies the following condition:

$$\begin{cases} 1-(1-0.9)^N > 0.99 \\ 1 \leq N \leq 5 \end{cases} \quad (1\text{-}6)$$

According to the foregoing formula (1-6), N=2 may be solved. In this case, the quantity of the super-resolution submodels may be set to 2.

It may be understood that, if there is one or two super-resolution submodels, the super-resolution model may not include the output synthesis module 1022, or may include the output synthesis module 1022. When there are two super-resolution submodels, the two super-resolution submodels may be cascaded. An input of the first super-resolution submodel is a low-resolution image, and a reconstructed image information output by the first super-resolution submodel is used as an input of the second super-resolution submodel, an output of the second super-resolution submodel is a reconstructed image of the super-resolution model.

As shown in FIG. 3, reconstructed image information output by the output synthesis module 1022 is:

$$O_S = \sum_{k=1}^{n-1} (w_k O_k) \quad (1\text{-}7)$$

k is a positive integer satisfying $1 \leq k \leq n-1$; and $w_k$ is a weight of a $k_{th}$ super-resolution submodel.

where k is a positive integer satisfying $1 \leq k \leq n-1$ and wk is a weight of a kth super-resolution submodel.

In an embodiment, the super-resolution submodel 1021 may be a three-layer fully convolutional deep neural network. In the three-layer convolutional deep neural network, the first convolution layer may be an input layer, and is used to extract image information by region. The input layer may include a plurality of convolution kernels, used to extract different image information. The second convolution layer may be a transform layer, and is used to perform non-linear transform on the extracted image information. If the extracted image information is X, the non-linear transform may be f(W·X+b). The image information X may be a multidimensional vector, and is multidimensional image information extracted by using the plurality of convolution kernels at the first convolution layer. W is a weight vector of the convolution kernel, b is a bias vector of the convolution kernel, and f may be an activation function. The third convolution layer may be an output layer, and is used to reconstruct image information output by the second convolution layer. Alternatively, the reconstruction process may be performing reconstruction by performing a convolution operation on an image by using the plurality of convolution kernels. An output of the output layer may be a 3-channel (color) image or a single-channel (grayscale) image.

If the super-resolution model includes a plurality of super-resolution submodels that are cascaded, in the foregoing three-layer fully convolutional deep neural network, the first convolution layer and the second convolution layer are used to extract image information from a low-resolution image, that is, obtain information that can be used for super-resolution reconstruction. The third convolution layer reconstructs a high-resolution image by using the image information extracted and transformed by the first two layers. The two additional convolution layers in the three-layer fully convolutional deep neural network can extract more precise image information than extracting the image information by using only one convolution layer. In addition, the super-resolution submodels constituted by three-layer fully convolutional deep neural networks need to be cascaded to constitute the super-resolution model, and cascading a plurality of super-resolution submodels requires more calculation resources, but a relatively small quantity of convolution layers indicates a relatively low calculation amount. Therefore, a tradeoff between calculation resources and precision needs to be considered for a quantity of convolution layers in the super-resolution submodels. When the super-resolution submodel uses the three-layer fully convolutional deep neural network, more precise image information can be extracted by using fewer calculation resources. The more precise image information helps reconstruct a higher-quality reconstructed image and save calculation resources.

In an embodiment, the weight vector W of the convolution kernel may be a parameter in the super-resolution model. In other words, in the training process of the initial super-resolution model, the weight vector W of the convolution kernel may be optimized based on the error loss.

In an embodiment, the error loss is:

$$L = \lambda_1 L1 + \lambda_2 L2 + \lambda_3 L3 \quad (1\text{-}8)$$

L1 is a pixel mean square error. For details, refer to the formula (1-2). $\lambda_1$ is a weight of the pixel mean square error. L2 is an image feature mean square error. For details, refer to the formula (1-3). $\lambda_2$ is a weight of the image feature mean square error, L3 is a regularization term of $w_k$, and $\lambda_3$ is a weight of the regularization term.

$$w = (w_1, w_2, w_3, \ldots, w_{N-1}) \quad (1\text{-}9)$$

w is a weight matrix of the super-resolution submodel.

$$L3 = w^T w, \text{ or } L3 = \Sigma |w_i| \quad (1\text{-}10)$$

Values of $\lambda_1$, $\lambda_2$, and $\lambda_3$ may be determined based on an experiment or experience.

The added regularization term L3 is used to reduce overfitting, improve precision of the newly constructed super-resolution model, and improve quality of the reconstructed image.

For example, in a face image reconstruction scenario, first, preparation before training needs to be performed, that is, a training set needs to be obtained. A specific process is as follows:

Step 1: An obtained high-resolution face image is $\{Y^m | 1 \leq m \leq M\} \varepsilon R^{a \times b}$.

M is a quantity of training samples, $R^{a \times b}$ indicates a size of the image, and a resolution of the high-resolution face image is a×b.

Step 2: Obtain a low-resolution face image $T^m = D(Y^m)$ by using a down-sampling function, where $\{T^m | 1 \leq m \leq M\} \varepsilon R^{(a/t) \times (b/t)}$.

D may be a down-sampling function, that is, a fuzzy function. A resolution of the low-resolution face image is (a/t)×(b/t), t is a positive integer, $\{T^m|1\leq m\leq M\}\epsilon R^{(a/t)\times(b/t)}$, and $\{Y^m|1\leq m\leq M\}\epsilon R^{a\times b}$, that is, $\{T^m|1\leq m\leq M\}\epsilon R^{(a/t)\times(b/t)}$ and $\{Y^m|1\leq m\leq M\}\epsilon R^{a\times b}$ constitute the training set.

Figure 4:
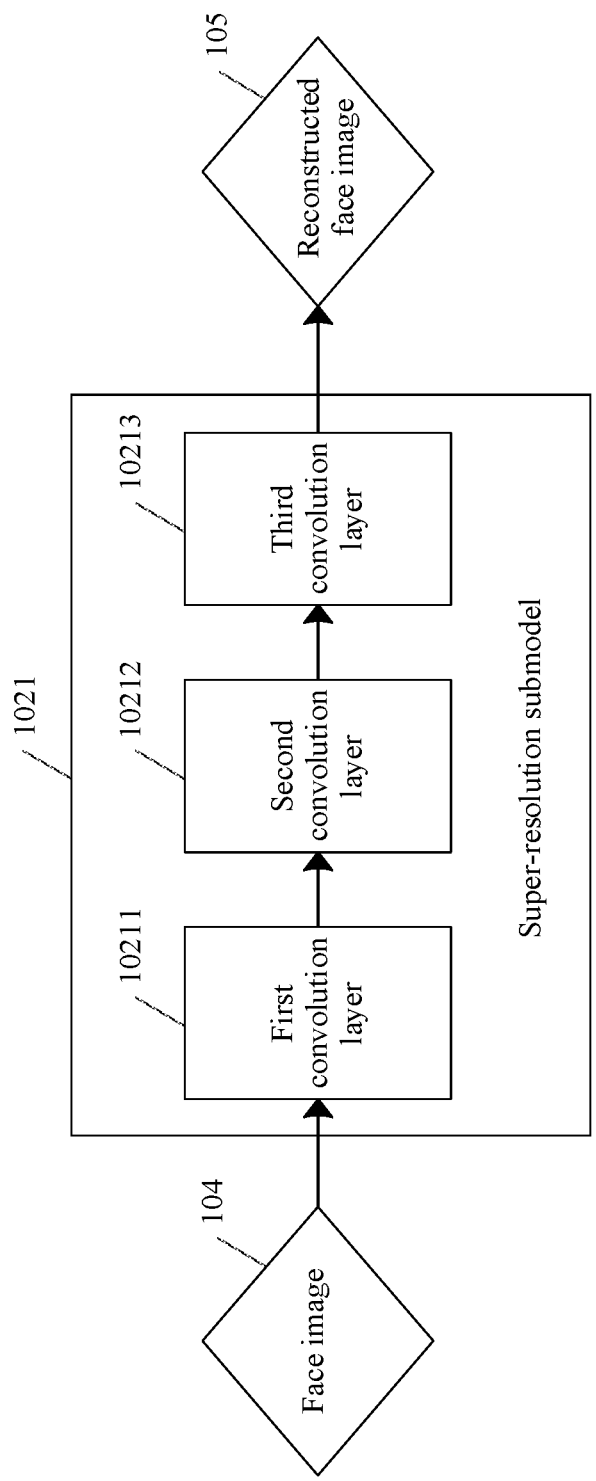
FIG. 4 is a schematic structural diagram of a super-resolution submodel according to an embodiment of this application.

Then, the super-resolution model is trained based on the training set. A specific process is as follows:

As shown in FIG. 3, the super-resolution model may include n super-resolution submodels. FIG. 4 is a schematic structural diagram of a super-resolution model according to an embodiment of this application. As shown in FIG. 4, a $k^{th}$ super-resolution submodel may be a three-layer fully convolutional deep neural network. An input of the $k^{th}$ super-resolution submodel is a face image 104, and the face image 104 may be a face image output by a $(k-1)^{th}$ super-resolution submodel. If k=1, the face image 104 may be the low-resolution image 101 input into the super-resolution model 102 in FIG. 3. To be specific, the face image output by the $(k-1)^{th}$ super-resolution submodel or the low-resolution face image is used as an input of the first convolution layer in the $k^{th}$ super-resolution submodel, an output of the first convolution layer in the $k^{th}$ super-resolution submodel is face image information $X_k$ obtained by performing a convolution operation by using each of s convolution kernels, and the face image information $X_k$ is used as an input of the second convolution layer in the $k^{th}$ super-resolution submodel. Xk= (X1, X2, . . . , Xs), an output of the second convolution layer in the $k^{th}$ super-resolution submodel is f(W·X+b), and an output of the third convolution layer in the $k^{th}$ super-resolution submodel is a reconstructed face image 105 obtained by performing convolution calculation by using f(W·X+b) and m convolution kernels. It should be noted that a size of each convolution kernel at the first convolution layer may be different from a size of a convolution kernel at the third convolution layer, and a size of a convolution kernel at the second convolution layer may be 1. A quantity of convolution kernels at the first convolution layer, a quantity of convolution kernels at the second convolution layer, and a quantity of convolution kernels at the third convolution layer may be the same or different. k is a positive integer satisfying $1\leq k\leq n-1$.

The $n^{th}$ super-resolution submodel may also be a three-layer fully convolutional deep neural network. Face image information input into the first convolution layer of the $n^{th}$ super-resolution submodel may be $$O_S = \sum_{k=1}^{n-1}(w_k O_k),$$

where $O_k$ is face image information of the reconstructed face image of the $k^{th}$ super-resolution submodel. The second convolution layer of the $n^{th}$ super-resolution submodel is similar to the second convolution layer of the $k^{th}$ super-resolution submodel. Details are not described again. A reconstructed face image 105 output by the third convolution layer of the $n^{th}$ super-resolution submodel is the reconstructed image 103 in the super-resolution model described in FIG. 3.

In the $n^{th}$ super-resolution submodel, a quantity of convolution kernels at the third convolution layer may be the same as a quantity of channels of the input low-resolution face image, and the convolution kernels are used to reconstruct the low-resolution face image, to obtain the reconstructed face image. For example, if the low-resolution face image has three channels, that is, R, G, and B each occupy one channel, there are three convolution kernels at the third convolution layer of the last super-resolution submodel, that is, the $n^{th}$ super-resolution submodel, and the three convolution kernels are used to reconstruct the low-resolution face image including three colors: red, green, and blue, to obtain the reconstructed face image. The reconstructed face image also consists of red, green, and blue. For another example, if the low-resolution face image has one channel, that is, the low-resolution face image is a grayscale image, there is one convolution kernel at the third convolution layer of the last super-resolution submodel, that is, the $n^{th}$ super-resolution submodel, and the convolution kernel is used to reconstruct a grayscale low-resolution face image, to obtain a reconstructed face image. The reconstructed face image is also a grayscale image.

In an embodiment, after the error loss is obtained, the parameters in the newly constructed super-resolution model may alternatively be determined based on the error loss and at least one of the following: the first image, the second image, and the third image. In other words, a device for constructing the image reconstruction model may determine the parameter in the newly constructed super-resolution model based on the error loss and an image related to the error loss, and does not need to adjust a parameter value based on the parameter in the initial super-resolution model.

It should be noted that the foregoing image reconstruction method may be applied to an image recognition system, for example, a facial recognition system. The foregoing image reconstruction method may be applied to an image intensifier system.

The methods in the embodiments of the present invention are described above in detail, and apparatuses in the embodiments of the present invention are provided below.

Figure 5:
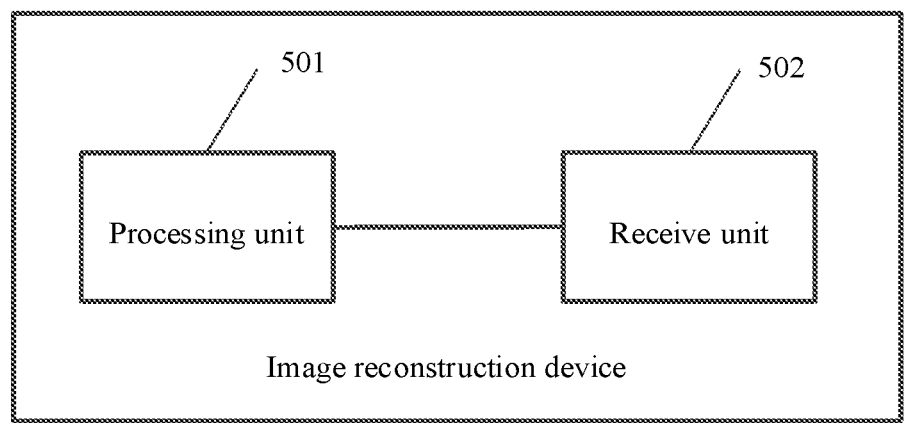
FIG. 5 is a schematic structural diagram of an image reconstruction device according to an embodiment of this application.

FIG. 5 is a schematic structural diagram of an image reconstruction device according to an embodiment of this application. As shown in FIG. 5, the device may include a processing module 501 and a receive module 502.

The processing module 501 inputs a first image into a newly constructed super-resolution model to obtain a reconstructed second image, where a resolution of the second image is higher than that of the first image;

the newly constructed super-resolution model is obtained by training an initial super-resolution model by using an error loss; the error loss includes a pixel mean square error and an image feature mean square error; and an image feature includes at least one of a texture feature, a shape feature, a spatial relationship feature, and an image high-level semantic feature; and the receive unit 502 is configured to receive the first image that is input into the newly constructed super-resolution model. In a possible implementation, the error loss is an error loss between a third image and a fourth image, and the third image is obtained through reconstruction after inputting a fifth image into the initial super-resolution model; the fourth image is a high-resolution image, and the fifth image is a low-resolution image obtained by performing blurring processing on the fourth image; and the initial super-resolution model is used to reconstruct an image input into the initial super-resolution model, to improve a resolution.

In a possible implementation, there are M third images, M fourth images, and M fifth images, there are M error losses, and the M third images are obtained through reconstruction after inputting the M fifth images into the initial super-resolution model; the M error losses are determined based on the M third images and the M fourth images; and any one of the M error losses is an error loss between an $i^{th}$ third image in the M third images and a $j^{th}$ fourth image in the M fourth images, an image obtained after a fifth image obtained by performing blurring processing on the $j^{th}$ fourth image is input into the initial super-resolution model is the $i^{th}$ third image, M is a positive integer greater than 1, and i and j each are a positive integer less than or equal to M.

In a possible implementation, the newly constructed super-resolution model is obtained by adjusting a parameter in the initial super-resolution model based on the M error losses; or the initial super-resolution model is the first super-resolution model, a parameter in the first super-resolution model is adjusted based on the first error loss in the M error losses to obtain the second super-resolution model, a parameter in an $r^{th}$ super-resolution model is adjusted based on an $r^{th}$ error loss to obtain an $(r+1)^{th}$ super-resolution model, and the newly constructed super-resolution model is obtained by adjusting a parameter in an $M^{th}$ super-resolution model by using an $M^{th}$ error loss, where r is a positive integer greater than or equal to 1 and less than or equal to M.

In a possible implementation, the initial super-resolution model includes n super-resolution submodels, and n is a positive integer greater than or equal to 2; the super-resolution submodel is used to reconstruct image information input into the super-resolution submodel, to improve a resolution; the image information includes pixel value information and image feature information;

in the n super-resolution submodels, an input of the first super-resolution submodel is the first image, an output of the first super-resolution submodel is used as an input of the second super-resolution submodel, an output of a $(t-1)^{th}$ super-resolution submodel is used as an input of a $t^{th}$ super-resolution submodel, and an output of the $t^{th}$ super-resolution submodel is used as an input of a $(t+1)^{th}$ super-resolution submodel; t is a positive integer satisfying $2 \leq t \leq n-1$; and the output of the $t^{th}$ super-resolution submodel is used as an input of an output synthesis module, an output of the output synthesis module is used as an input of an $n^{th}$ super-resolution submodel, an output of the $n^{th}$ super-resolution submodel is the second image, and the output synthesis module is configured to determine the input of the $n^{th}$ super-resolution submodel based on reconstructed image information output by the first n−1 super-resolution submodels and a weight of each piece of the output reconstructed image information. In other words, the foregoing initial super-resolution model is included in the processing unit 501.

In a possible implementation, the reconstructed image information output by the output synthesis module is $$O_S = \sum_{k=1}^{n-1}(w_k O_k),$$

where k is a positive integer satisfying $1 \leq k \leq n-1$ and $w_k$ is a weight of a $k^{th}$ super-resolution submodel.

In a possible implementation, $w_k$ is the parameter in the super-resolution model.

In a possible implementation, the super-resolution submodel is a three-layer fully convolutional deep neural network.

In a possible implementation, the error loss $L=\lambda_1 L1+\lambda_2 L2+\lambda_3 L3$, where L1 is the pixel mean square error, $\lambda_1$ is a weight of the pixel mean square error, L2 is the image feature mean square error, $\lambda_2$ is a weight of the image feature mean square error, L3 is a regularization term of $w_k$, and $\lambda_3$ is a weight of the regularization term.

It should be noted that for implementation of each module, refer to the corresponding descriptions of the method embodiment shown in FIG. 1. Details are not described herein again.

The foregoing image reconstruction device may be an image recognition device, for example, a facial recognition device. The image reconstruction device may also be an image intensifier device or the like.

Figure 6:
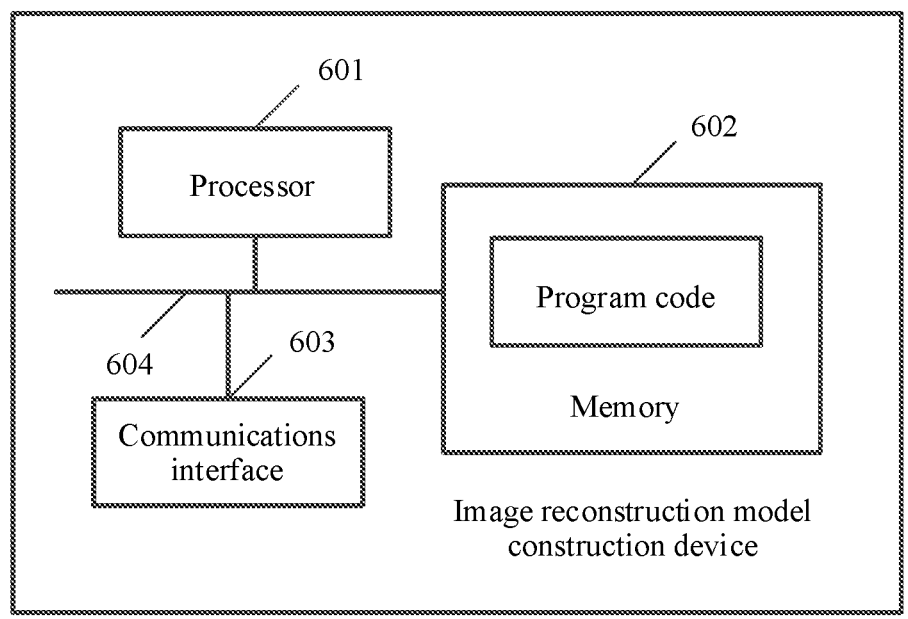
FIG. 6 is a schematic structural diagram of another image reconstruction device according to an embodiment of this application.

FIG. 6 is a schematic structural diagram of another image reconstruction device according to an embodiment of this application. As shown in FIG. 6, the device includes a processor 601, a memory 602, and a communications interface 603. The processor 601, the memory 602, and the communications interface 603 are connected to each other by using a bus 604.

The memory 602 includes but is not limited to a random access memory (RAM), a read-only memory (ROM), an erasable programmable read-only memory (EPROM), or a portable read-only memory (CD-ROM). The memory 602 is configured to store a related instruction and related data. Specifically, the memory 602 may be configured to store a super-resolution model.

The communications interface 603 may be configured to communicate with another device, for example, may be configured to receive a training set, where the training set includes a fifth image and a fourth image, the fourth image is a high-resolution image, and the fifth image is a low-resolution image obtained after blurring processing is performed on the fourth image. The communications interface 603 may be further configured to receive a low-resolution image that needs to be reconstructed, for example, receive a first image.

The processor 601 may be one or more central processing units (CPU). When the processor 601 is one CPU, the CPU may be a single-core CPU or a multi-core CPU.

The processor 601 in the image reconstruction device is configured to read program code stored in the memory 602, to perform the following operations:

inputting a first image into a newly constructed super-resolution model to obtain a reconstructed second image, where a resolution of the second image is higher than that of the first image;

the newly constructed super-resolution model is obtained by training an initial super-resolution model by using an error loss; the error loss includes a pixel mean square error and an image feature mean square error; and an image feature includes at least one of a texture feature, a shape feature, a spatial relationship feature, and an image high-level semantic feature.

In a possible implementation, the error loss is an error loss between a third image and a fourth image, and the third image is obtained through reconstruction after inputting a fifth image into the initial super-resolution model; the fourth image is a high-resolution image, and the fifth image is a low-resolution image obtained by performing blurring processing on the fourth image; and the initial super-resolution model is used to reconstruct an image input into the initial super-resolution model, to improve a resolution.

In a possible implementation, there are M third images, M fourth images, and M fifth images, there are M error losses, and the M third images are obtained through reconstruction after inputting the M fifth images into the initial super-resolution model; the M error losses are determined based on the M third images and the M fourth images; and any one of the M error losses is an error loss between an $i^{th}$ third image in the M third images and a $j^{th}$ fourth image in the M fourth images, an image obtained after a fifth image obtained by performing blurring processing on the $j^{th}$ fourth image is input into the initial super-resolution model is the $i^{th}$ third image, M is a positive integer greater than 1, and i and j each are a positive integer less than or equal to M.

In a possible implementation, the newly constructed super-resolution model is obtained by adjusting a parameter in the initial super-resolution model based on the M error losses; or the initial super-resolution model is the first super-resolution model, a parameter in the first super-resolution model is adjusted based on the first error loss in the M error losses to obtain the second super-resolution model, a parameter in an $r^{th}$ super-resolution model is adjusted based on an $r^{th}$ error loss to obtain an $(r+1)^{th}$ super-resolution model, and the newly constructed super-resolution model is obtained by adjusting a parameter in an $M^{th}$ super-resolution model by using an $M^{th}$ error loss, where r is a positive integer greater than or equal to 1 and less than or equal to M.

In a possible implementation, the initial super-resolution model includes n super-resolution submodels, and n is a positive integer greater than or equal to 2; the super-resolution submodel is used to reconstruct image information input into the super-resolution submodel, to improve a resolution; the image information includes pixel value information and image feature information;

in the n super-resolution submodels, an input of the first super-resolution submodel is the first image, an output of the first super-resolution submodel is used as an input of the second super-resolution submodel, an output of a $(t-1)^{th}$ super-resolution submodel is used as an input of a $t^{th}$ super-resolution submodel, and an output of the $t^{th}$ super-resolution submodel is used as an input of a $(t+1)^{th}$ super-resolution submodel; t is a positive integer satisfying $2 \leq t \leq n-1$; and the output of the $t^{th}$ super-resolution submodel is used as an input of an output synthesis module, an output of the output synthesis module is used as an input of an $n^{th}$ super-resolution submodel, an output of the $n^{th}$ super-resolution submodel is the second image, and the output synthesis module is configured to determine the input of the $n^{th}$ super-resolution submodel based on reconstructed image information output by the first n−1 super-resolution submodels and a weight of each piece of the output reconstructed image information.

In a possible implementation, the reconstructed image information output by the output synthesis module is $$O_S = \sum_{k=1}^{n-1}(w_k O_k),$$

where k is a positive integer satisfying $1 \leq k \leq n-1$ and $w_k$ is a weight of a kth super-resolution submodel.

In a possible implementation, $w_k$ is the parameter in the super-resolution model.

In a possible implementation, the super-resolution submodel is a three-layer fully convolutional deep neural network.

In a possible implementation, the error loss $L = \lambda_1 L1 + \lambda_2 L2 + \lambda_3 L3$, where L1 is the pixel mean square error, $\lambda_1$ is a weight of the pixel mean square error, L2 is the image feature mean square error, $\lambda_2$ is a weight of the image feature mean square error, L3 is a regularization term of $w_k$, and $\lambda_3$ is a weight of the regularization term.

It should be noted that for implementation of each foregoing operation, refer to the corresponding descriptions of the method embodiment shown in FIG. 1. Details are not described herein again. The foregoing image reconstruction device may be an image recognition device, for example, a facial recognition device. The image reconstruction device may also be an image intensifier device or the like.

An embodiment of the present invention further provides a chip system. The chip system includes at least one processor, a memory, and an interface circuit. The memory, the interface circuit, and the at least one processor are interconnected by using a line, and the at least one memory stores an instruction. When the instruction is executed by the processor, the method procedure shown in FIG. 1 is implemented.

An embodiment of the present invention further provides a computer-readable storage medium. The computer-readable storage medium stores an instruction, and when the instruction is run on a processor, the method procedure shown in FIG. 1 is implemented.

An embodiment of the present invention further provides a computer program product. When the computer program product runs on a processor, the method procedure shown in FIG. 1 is implemented.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium includes: any medium that can store program code, such as a ROM or a random access memory RAM, a magnetic disk or an optical disc.

What is claimed is:

1. An image reconstruction method, comprising:
    inputting a first image into a newly constructed super-resolution model to obtain a reconstructed second image, wherein a resolution of the second image is higher than that of the first image; and
    wherein the newly constructed super-resolution model is obtained by training an initial super-resolution model using an error loss; the error loss comprises a pixel mean square error and a mean square error of an image feature; and the image feature comprises at least one of a texture feature, a shape feature, a spatial relationship feature, or an image high-level semantic feature;

wherein the error loss is an error loss between a third image and a fourth image, and the third image is obtained through reconstruction after inputting a fifth image into the initial super-resolution model; the fourth image is a high-resolution image, and the fifth image is a low-resolution image obtained by performing blurring processing on the fourth image; and the initial super-resolution model is used to reconstruct an image input into the initial super-resolution model.

2. The method according to claim 1, wherein there are M third images, M fourth images, and M fifth images, there are M error losses, and the M third images are obtained through reconstruction after inputting the M fifth images into the initial super-resolution model; the M error losses are determined based on the M third images and the M fourth images; and any one of the M error losses is an error loss between an $i^{th}$ third image in the M third images and a $j^{th}$ fourth image in the M fourth images, an image obtained after a fifth image obtained by performing blurring processing on the $j^{th}$ fourth image is input into the initial super-resolution model is the $i^{th}$ third image, M is a positive integer greater than 1, and i and j each are a positive integer less than or equal to M.

3. The method according to claim 2, wherein the newly constructed super-resolution model is obtained by adjusting a parameter in the initial super-resolution model based on the M error losses; or the initial super-resolution model is the first super-resolution model, a parameter in the first super-resolution model is adjusted based on the first error loss in the M error losses to obtain the second super-resolution model, a parameter in an $r^{th}$ super-resolution model is adjusted based on an $r^{th}$ error loss to obtain an $(r+1)^{th}$ super-resolution model, and the newly constructed super-resolution model is obtained by adjusting a parameter in an $M^{th}$ super-resolution model by using an $M^{th}$ error loss, wherein r is a positive integer greater than or equal to 1 and less than or equal to M.

4. The method according to claim 1, wherein the initial super-resolution model comprises n super-resolution submodels, and n is a positive integer greater than or equal to 2; the super-resolution submodels are used to reconstruct image information, to improve a resolution; the image information comprises pixel value information and image feature information;

in the n super-resolution submodels, an input of a first super-resolution submodel is the first image, an output of the first super-resolution submodel is used as an input of a second super-resolution submodel, an output of a $(t-1)^{th}$ super-resolution submodel is used as an input of a $t^{th}$ super-resolution submodel, and an output of the $t^{th}$ super-resolution submodel is used as an input of a $(t+1)^{th}$ super-resolution submodel; t is a positive integer satisfying $2 \le t \le n-1$; and the output of the $t^{th}$ super-resolution submodel is used as an input of an output synthesis module, an output of the output synthesis module is used as an input of an $n^{th}$ super-resolution submodel, an output of the $n^{th}$ super-resolution submodel is the second image, and the output synthesis module is configured to determine the input of the $n^{th}$ super-resolution submodel based on reconstructed image information output by the first n−1 super-resolution submodels and a weight of each piece of the output reconstructed image information.

5. The method according to claim 4, wherein the reconstructed image information output by the output synthesis module is $$O_S = \sum_{k=1}^{n-1}(w_k O_k),$$

where k is a positive integer satisfying $1 \le k \le n-1$ and $w_k$ is a weight of a $k^{th}$ super-resolution submodel.

6. The method according to claim 5, wherein $w_k$ is a parameter in the initial super-resolution model.

7. The method according to claim 4, wherein the super-resolution submodels are a three-layer fully convolutional deep neural network.

8. The method according to claim 5, wherein the error loss is calculated as: $L=\lambda_1 L1+\lambda_2 L2+\lambda_3 L3$, wherein L1 is the pixel mean square error, $\lambda_1$ is a weight of the pixel mean square error, L2 is the image feature mean square error, $\lambda_2$ is a weight of the image feature mean square error, L3 is a regularization term of $w_k$, and $\lambda_3$ is a weight of the regularization term.

9. An image reconstruction device, comprising a processor and a memory, wherein the memory is configured to store a program instruction, and the processor is configured to invoke the program instruction to perform the following operations:

inputting a first image into a newly constructed super-resolution model to obtain a reconstructed second image, wherein a resolution of the second image is higher than that of the first image;

the newly constructed super-resolution model is obtained by training an initial super-resolution model by using an error loss; the error loss comprises a pixel mean square error and a mean square error of an image feature; and the image feature comprises at least one of a texture feature, a shape feature, a spatial relationship feature, or an image high-level semantic feature;

wherein the error loss is an error loss between a third image and a fourth image, and the third image is obtained through reconstruction after inputting a fifth image into the initial super-resolution model; the fourth image is a high-resolution image, and the fifth image is a low-resolution image obtained by performing blurring processing on the fourth image; and the initial super-resolution model is used to reconstruct an image input into the initial super-resolution model.

10. The device according to claim 9, wherein there are M third images, M fourth images, and M fifth images, there are M error losses, and the M third images are obtained through reconstruction after inputting the M fifth images into the initial super-resolution model; the M error losses are determined based on the M third images and the M fourth images; and any one of the M error losses is an error loss between an $i^{th}$ third image in the M third images and a $j^{th}$ fourth image in the M fourth images, an image obtained after a fifth image obtained by performing blurring processing on the $j^{th}$ fourth image is input into the initial super-resolution model is the $i^{th}$ third image, M is a positive integer greater than 1, and i and j each are a positive integer less than or equal to M.

11. The device according to claim 10, wherein the newly constructed super-resolution model is obtained by adjusting a parameter in the initial super-resolution model based on the M error losses; or the initial super-resolution model is the first super-resolution model, a parameter in the first super-resolution model is adjusted based on the first error loss in the M error losses to obtain the second super-resolution model, a parameter in an $r^{th}$ super-resolution model is adjusted based on an $r^{th}$ error loss to obtain an $(r+1)^{th}$ super-resolution model, and the newly constructed super-resolution model is obtained by adjusting a parameter in an $M^{th}$ super-resolution model by using an $M^{th}$ error loss, wherein r is a positive integer greater than or equal to 1 and less than or equal to M.

12. The device according to claim 9, wherein the initial super-resolution model comprises n super-resolution submodels, and n is a positive integer greater than or equal to 2; the super-resolution submodels are used to reconstruct image information, to improve a resolution; the image information comprises pixel value information and image feature information;

in the n super-resolution submodels, an input of a first super-resolution submodel is the first image, an output of the first super-resolution submodel is used as an input of a second super-resolution submodel, an output of a $(t-1)^{th}$ super-resolution submodel is used as an input of a $t^{th}$ super-resolution submodel, and an output of the $t^{th}$ super-resolution submodel is used as an input of a $(t+1)^{th}$ super-resolution submodel; t is a positive integer satisfying $2 \leq t \leq n-1$; and the output of the $t^{th}$ super-resolution submodel is used as an input of an output synthesis module, an output of the output synthesis module is used as an input of an $n^{th}$ super-resolution submodel, an output of the $n^{th}$ super-resolution submodel is the second image, and the output synthesis module is configured to determine the input of the $n^{th}$ super-resolution submodel based on reconstructed image information output by the first n−1 super-resolution submodels and a weight of each piece of the output reconstructed image information.

13. The device according to claim 12, wherein the reconstructed image information output by the output synthesis module is $$O_S = \sum_{k=1}^{n-1}(w_k O_k),$$

where k is a positive integer satisfying $1 \leq k \leq n-1$ and $w_k$ is a weight of a $k^{th}$ super-resolution submodel.

14. The device according to claim 13, wherein $w_k$ is a parameter in the initial super-resolution model.

15. The device according to claim 12, wherein the super-resolution submodels are a three-layer fully convolutional deep neural network.

16. The device according to claim 13, wherein the error loss is calculated as: $L = \lambda_1 L1 + \lambda_2 L2 + \lambda_3 L3$, wherein L1 is the pixel mean square error, $\lambda_1$ is a weight of the pixel mean square error, L2 is the image feature mean square error, $\lambda_2$ is a weight of the image feature mean square error, L3 is a regularization term of $w_k$, and $\lambda_3$ is a weight of the regularization term.

17. A non-transitory computer-readable storage medium, wherein the computer-readable storage medium stores a program instruction, and when the program instruction is run by a processor, the method according to claim 1 is implemented.

* * * * *